United States Patent [19]

Morrow

[11] Patent Number: 4,614,027

[45] Date of Patent: Sep. 30, 1986

[54] ASSEMBLING MACHINE WITH DRIVE MECHANISM FOR FEED ASSEMBLY

[75] Inventor: Duke Morrow, Plymouth, Mich.

[73] Assignee: Multi Feed, Inc., Northville, Mich.

[21] Appl. No.: 608,132

[22] Filed: May 7, 1984

[51] Int. Cl.⁴ .................... B23P 21/00; B23P 19/00
[52] U.S. Cl. ............................................ 29/707; 29/794
[58] Field of Search .............. 74/89.15; 29/707, 709, 29/712, 714, 794, 813

[56] References Cited

U.S. PATENT DOCUMENTS

| | | | |
|---|---|---|---|
| 3,745,840 | 7/1973 | Guralnick | 74/89.15 |
| 3,793,896 | 2/1974 | Price et al. | 74/89.15 |
| 3,803,926 | 4/1974 | Winter | 74/89.15 |
| 3,803,927 | 4/1974 | Lawler | 74/89.15 |
| 3,840,962 | 10/1974 | Collet | 29/714 |
| 4,089,624 | 5/1978 | Nichols et al. | 74/89.15 |
| 4,383,359 | 5/1983 | Suzuki et al. | 29/794 |
| 4,530,251 | 7/1985 | Henle | 74/89.15 |

Primary Examiner—Howard N. Goldberg
Assistant Examiner—Steven Nichols
Attorney, Agent, or Firm—Reising, Ethington, Barnard Perry & Milton

[57] ABSTRACT

A part feed assembly (10) for feeding parts from a feed line to an assembling machine including a multiple part escapement (12) including a plurality of linearly aligned openings (14) for sequentially receiving a part from the feed line. A drive mechanism (20) is operatively connected to a ball screw shaft (16) for incremental rotation of the ball screw shaft (16). A cart (44) threadedly engages the ball screw shaft (16) for incremental linear movement axially along the shaft (16) and for supporting the escapement (12) thereon to advance the openings (14) in the escapement from the feed line to the assembling machine where the parts are released from the openings (14).

12 Claims, 2 Drawing Figures

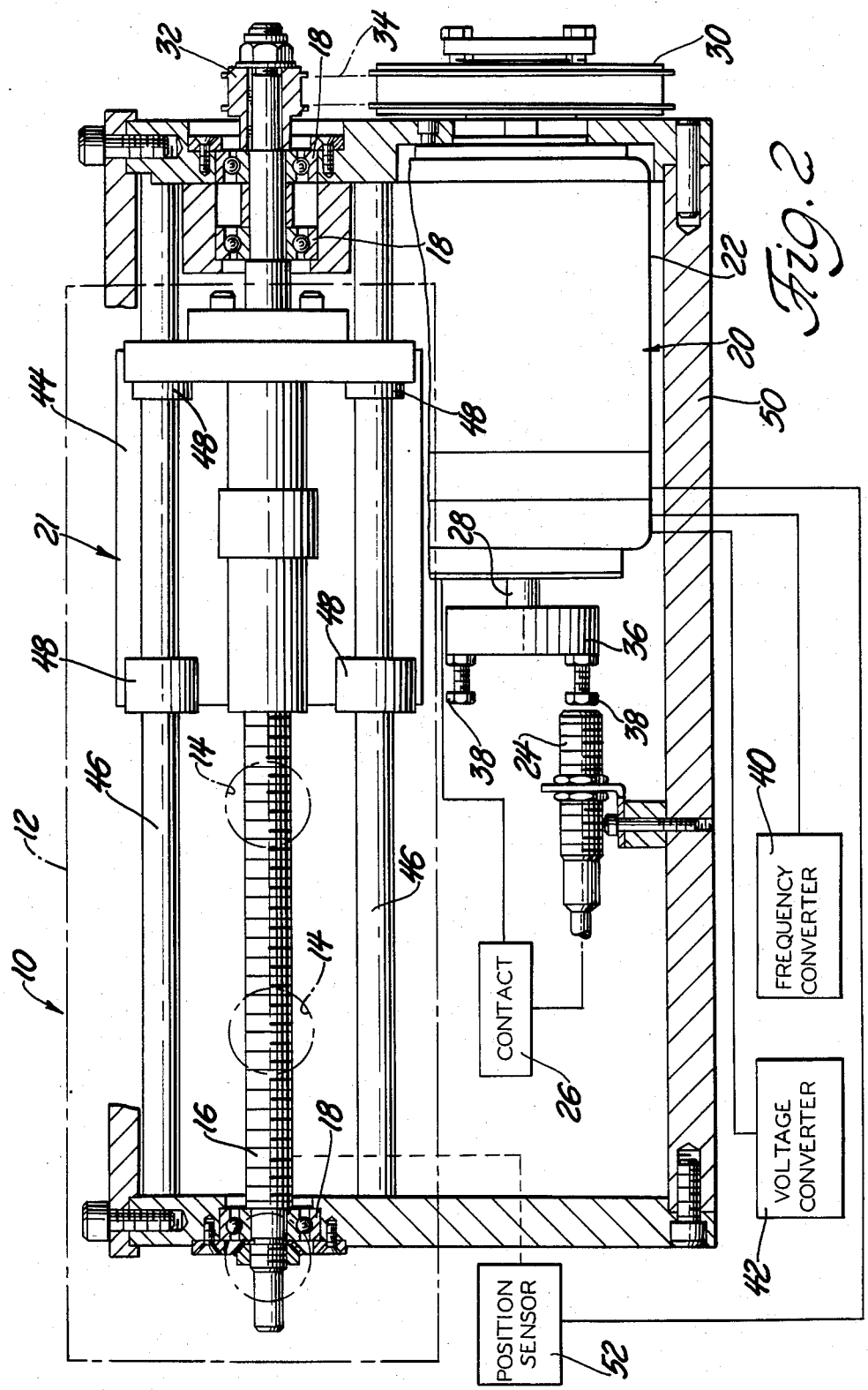

ASSEMBLING MACHINE WITH DRIVE MECHANISM FOR FEED ASSEMBLY

TECHNICAL FIELD

This invention relates to assemblies used for feeding multiple parts, usually small parts such as screws or bolts, to an assembling machine.

BACKGROUND ART

Prior art assemblies used for feeding multiple parts such as screws or bolts to an assembling machine have several inherent problems. The assembly generally consists of a gravity feed or similar mechanism for delivering parts to a track feed or platform having a plurality of openings therein. The assembly must be timed so that an opening is disposed below the feed line for a part to fall into the opening and then the track feed is advanced to dispose the next opening below the feed line to receive the next part. The track feed, or escapement, may include a plurality of openings in it to sequentially receive parts which are fed to an assembling mechanism. Prior art actuating mechanisms require a slow speed to accomplish this meticulous operation. Prior art mechanisms have been driven by a hydraulic mechanism. These mechanisms developed leaks and were inefficient. They lacked the ability to actuate the precise movement required for the operation. Additionally, prior art mechanisms have been found to be energy inefficient and quite noisy.

Drive mechanisms including stepping motors for driving a ball screw to advance linearly in a step fashion have been adapted to various arts. The U.S. patent to Nickels et al 4,089,624, issued May 16, 1978 discloses a pump assembly including a motor assembly which is a pulse operated stepping motor. A pump piston is mounted for movement in an axial direction into and out of a pump cylinder, the piston being secured to a lead screw. A timing belt provides a driving connection between the motor and drive shaft. The upper end of the drive shaft axel includes a driven nut which upon actuation of rotation by the motor linearly extends and retracts the screw and piston.

The U.S. Pat. Nos. to Price et al 3,793,896, issued Feb. 26, 1974, and to Lawler 3,803,927, issued Apr. 16, 1974 disclose incremental linear positioning apparatus. The apparatus include a stepping motor for driving a ball nut assembly. These assemblies have been used for positioning in very small increments a workpiece or machine element.

This invention relates to the art of feeding parts to an assembling machine and provides energy efficiency and noise reduction with a concommitent increase in speed of operation. The elimination of hydraulic or pneumatic piping and valving provides an associated elimination of fluid leakage. The result is a cost effective function.

STATEMENT OF THE INVENTION

According to the present invention, there is provided a part feed assembly for feeding parts from a feed line to an assembling machine, the assembly including a multiple part escapement including a plurality of linearly aligned openings for sequentially receiving a part from a feed line. The assembly further includes a ball screw shaft and a drive mechanism operatively connected to the ball screw shaft for incremental rotation of the ball screw shaft. A driven support mechanism threadably engages the ball screw shaft for increment linear movement axially along the shaft and for supporting the escapement thereon to advance the openings in the escapement from feed line to the assembling machine where the parts are released from the openings.

FIGURES IN THE DRAWINGS

Other advantages of the present invention will be readily appreciated as the same becomes better understood by reference to the following detailed description when considered in connection with the accompanying drawings wherein;

FIG. 2 is a cross sectional view of the invention.

DETAILED DESCRIPTION OF THE DRAWINGS

Figure 1:
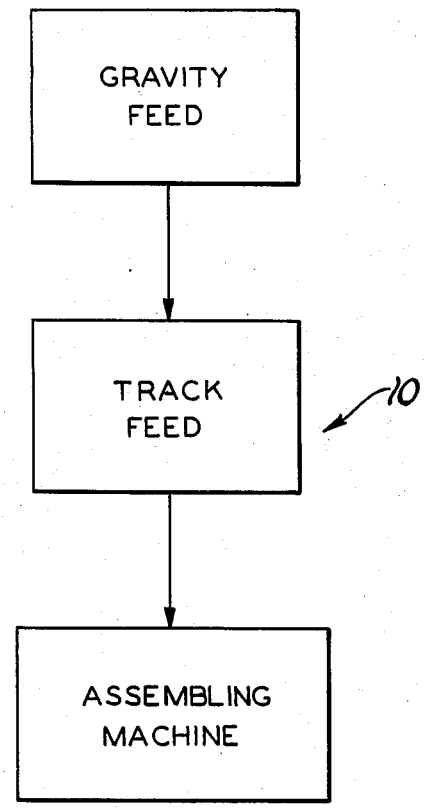
FIG. 1 is a block diagram showing the environment of the invention.

FIG. 1 is a block diagram showing the course of a workpiece as it is handled by the invention. A gravity feed, such as a conveyor belt, feeds small parts such as screws, nuts or bolts to a track feed, generally shown at 10. The track feed 10 includes an escapement having a plurality of openings therein, each opening for receiving a single part. Timing is critical so that an opening is disposed below the gravity feed line for a part to fall into the opening. The escapement is advanced in a stepwise fashion to dispose the next opening below the gravity feed to receive the next part. Prior art assemblies sacrifice exactness for speed as there is insufficient control of a pneumatic or hydraulic assembly to efficiently perform the function. The parts are delivered by the escapement to a part assembling machine where the part is released from the opening of the escapement to be included in an operation performed by the assembling machine.

The part feed assembly 10 for feeding parts from the feed line to the assembling machine is generally shown at 10 in FIG. 2. The assembly 10 includes a multiple part escapement schematically shown at 12 in phantom. The escapement 12 includes a plurality of linearly aligned openings 14 for sequentially receiving a part from the gravity feed line. A ball screw shaft 16 is supported for rotation in bearing assemblies 18. Drive means generally indicated at 20 is operatively connected to the ball screw shaft 16 for incremental rotation of the ball screw shaft 16. The drive means 20 rotates the ball shaft 16 in a stepwise fashion. Driven support means generally indicated at 21 threadedly engages the ball screw shaft 16 through a common ball drive for incremental linear movement axially along the ball screw shaft 16 and supports the escapement 22 thereon to advance the openings 14 in the escapement 22 from the gravity feed line to the assembling machine where parts are released from the openings 14.

More particularly, the drive means 20 includes an AC synchronous motor 22 and control means for controlling the stepwise on/off operation of the motor 22 to actuate the rotation of the ball screw shaft 16 in a controlled step wise manner. The control means includes a proximity switch 24 which acts as a limit switch for tripping a contact shown schematically at 26 to stop the motor 22. The contact 26 is timed to open after being tripped to restart the motor 22 thereby operating the motor 22 in a stepwise fashion. The motor 22 includes a drive shaft 28 operatively connected to the ball screw shaft 16 by a drive pulley 30 mounted on the drive shaft 28 and driven pulley 32 mounted on the ball screw shaft 16. A belt 34 is entrained between the pulleys 30 and 32. The control means further includes a cam member 36 mounted on the drive shaft 28 and having stop actuating means mounted thereon in proximity to the proximity switch 24 for actuating the proximity switch 24 during rotation of said drive shaft 28 to step drive the motor 22. The stop actuating means includes a plurality of screw or bolt members 38 mounted in and extending from the cam 36 about an arc toward the proximity switch 24 to actuate the switch 24 upon being into proximity therewith during rotation of the drive shaft 28. The screw members 38 are spaced about an arc on the cam member 36 at predetermined distances from each other to coordinate actuation of the motor 22 with the spacing of the openings 14 in escapement 12 thereby aligning the openings 14 with the deposit of parts from the gravity feed line and the release of parts from the openings 14 to the assembling machine, as indicated in FIG. 1. The assembly thereby provides a precise and efficiently run feed mechanism. Since the proximity switch 24 works, by being tripped when the screws 38 are in proximity and not in contact therewith, there is no meshing or contact between the parts.

The drive means 20 may include a frequency converter 40 for changing the speed of the motor 22 to coordinate the speed of advancement of the openings 14 with the speed of the parts delivered to from the gravity feed line. The drive means 20 may also include a voltage convertor 42 for changing the effective torque of the drive shaft 28. In this manner, the assembly may be adapted to various external conditions encountered in the workplace. Specifically, the motor 22 may provide increased torque or speed or control of torque or speed so as to adapt the assembly to the various conditions.

The driven support means 21 includes a cart member 44 operatively connected to the ball screw shaft 16, generally through a ball assembly commonly known in the art, for axial movement therealong in response to rotation of the ball screw shaft 16. The assembly 10 includes antirotation means for preventing rotation of the cart 44 with the rotating ball screw shaft 16. The antirotation means includes a pair of rods 46 spaced from and parallel to the ball screw shaft 16. The cart 44 slidably engages the rods 46 for axially advancing along the rods 46 as the cart 44 advances axially along the ball screw shaft 16. The cart 44 includes annular portions 48 having internal bearing surfaces engaging the rods 46. The escapement 12 is mounted on the cart 44 to be carried and supported thereby.

A housing 50 supports the ball screw shaft 16 for rotation within the bearing assemblies 18. The motor 22 is mounted within the housing 50 with the drive shaft 28 being spaced from and parallel to the ball screw shaft 16. As previously stated, the drive shaft 28 and ball screw shaft 16 have pulleys 30 and 32 mounted thereon and a belt 34 entrained over the pulleys 30, 32 for operatively connecting the balls screw shaft 16 and the drive shaft 28.

Position sensing means 52 senses the position of the driven cart 44 relative the ball screw shaft 16 and communicates with the drive means 20 to reverse drive the ball screw shaft 16 and return the cart 44 from a predetermined position on the ball screw shaft 16 to the starting positon of the cart 44 on the ball screw shaft 16.

In operation, the AC synchronous motor 22 drives the drive shaft 28 to rotate the drive pulley 30 to actuate movement of the ball screw shaft 16 through the pulley 32. As the ball screw shaft 16 is actuated to rotate, the cart 44 is moved along the ball screw shaft 16. As the drive shaft 28 of the AC synchronous motor 22 rotates, he screws 38 are brought into proximity of the AC proximity switch 24 so as to stop the motor 22 in a stepwise fashion thereby advancing the cart 44 in a stepwise fashion along the ball screw shaft 16. The screws 38 are spaced so that the stepwise operation of the motor 22 corresponds to the advancement of openings 14 in the escapement or track feed 12 so that parts, such as screws, are dropped into an opening 14. The escapement 12 is then advanced, and then the next screw is dropped into the opening 14, and so on. When the cart 44 reaches the end of the ball screw shaft 16, the position sensor 52 actuates the motor 22 to return the cart 44 to the position shown in FIG. 2. The drive pulley 30 and driven pulley 32 may be changed so as to change the speed of the ball screw shaft 16. Alternatively, the screws 38 may be spaced at various points along the cam 36 or additional screws may be added to change the speed of the cart 44 or the timing between sequenced stops of the motor 22. The frequency convertor 40 may be added to change the speed of the AC synchronous motor 22 or the voltage convertor 42 may be added to change the effective torque of the drive shaft 28.

The invention has been described in an illustrative manner, and it is to be understood that the terminology which has been used is intended to be in the nature of words of description rather than of limitation.

Obviously many modifications and variations of the present invention are possible in light of the above teachings. It is therefore, to be understood that within the scope of the appended claims, wherein reference numerals are merely for convenience and are not to be in any limiting, the invention may be practiced otherwise that is specifically described.

What is claimed is:

1. An assembling machine combination comprising: a feed line; a part assembling machine; and a part feed assembly (10) for feeding parts from the feed line to the assembling machine, said part feed assembly (10) including a multiple part escapement (12) including a plurality of linearly aligned openings (14) for sequentially receiving a part from the feed line, a ball screw shaft (16), drive means (20) operatively connected to said ball screw shaft (16) for incremental rotation of said ball screw shaft (16), driven support means (21) threadably engaging said ball screw shaft (16) for incremental linear movement axially along said ball screw shaft (16) and for supporting said escapement (12) thereon to advance said openings (14) in said escapement (12) from the feed line to the assembling machine where the parts are released from said openings (14).

2. A combination as set forth in claim 1 wherein said drive means (20) includes an AC synchronous motor (22) and control means for controlling the stepwise on/off operation of said motor (22) to actuate the rotation of said ball screw shaft (16) in a controlled stepwise manner.

3. A combination as set forth in claim 2 wherein said control means includes a proximity switch (24) and said motor (22) includes a drive shaft (28) operatively connected to said ball screw shaft (16), said control means including a cam member (36) mounted on said drive shaft (28) and stop actuating means mounted thereon in proximity to said proximity switch (24) for actuating said proximity switch (24) during rotation of said drive shaft (28) to step drive said motor (22).

4. A combination as set forth in claim 3 wherein said stop actuating means includes a plurality of screw members (38) mounted in and extending from said cam member (36) about an arc towards said proximity switch (24) to actuate said switch (24) upon being brought into proximity therewith during rotation of said drive shaft (28).

5. A combination as set forth in claim 4 wherein said screw members (38) are spaced about said arc on said cam member (36) at predetermined distances from each other to coordinate actuation of said motor (22) with the spacing of said openings (14) in said escapement (12) thereby aligning said openings (14) with the deposit of parts from the feed line and the release of parts from said openings (14) to the assembling machine.

6. A combination as set forth in claim 5 wherein said drive means (20) includes a frequency converter (40) for changing the speed of said motor (22) to coordinate the speed of advancement of said opening (14) with the speed of parts delivered from the feed line.

7. A combination as set forth in claim 5 wherein said drive means (20) includes a voltage converter (42) for changing the effective torque of said drive shaft (28).

8. A combination as set forth in claim 2 wherein said driven support means (21) includes a cart member (44) operatively connected to said ball screw shaft (16) for axial movement therealong in response to rotation of said ball screw shaft (16), said assembly (10) including anti-rotation means for preventing rotation of said cart (44) with said rotating ball screw shaft (16).

9. A combination as set forth in claim 8 wherein said anti-rotation means includes a pair of rods (46) spaced from and parallel to said ball screw shaft (16), said cart (44) slidably engaging said rods (46) for axially advancing along said rods (46) as said cart (44) advances axially along said ball screw shaft (16).

10. A combination as set forth in claim 9 includng a housing (50) supporting said ball screw shaft (16) for rotation, said motor (22) being mounted within said housing (50) with said drive shaft (28) being spaced from and parallel to said ball screw shaft (16), said drive shaft (28) and said ball screw shaft (16) having pulleys (30,32) mounted thereon and a belt entrained over said pulleys (30,32) for operatively connecting said ball screw shaft (16) and said drive shaft (28).

11. A combination as set forth in claim 2 including position sensing means (52) for sensing the position of said driven support means (44) relative to said ball screw shaft (16) and for communicating with said drive means (20) to reverse drive said ball screw shaft (16) to return said driven support means (21) from a predetermined position on said ball screw shaft (16) to the starting position of said driven support means (44) on said ball screw shaft (16).

12. A combination as set forth in claim 1 wherein said feed line being a gravity feed assembly.

* * * * *